United States Patent [19]
Kim

[11] Patent Number: 5,323,438
[45] Date of Patent: Jun. 21, 1994

[54] PROGRAMMABLE PULSE-WIDTH MODULATION SIGNAL GENERATOR

[75] Inventor: Young S. Kim, Seoul, Rep. of Korea

[73] Assignee: Samsung Electronics Co., Ltd., Kyongki-do, Rep. of Korea

[21] Appl. No.: 978,749

[22] Filed: Nov. 19, 1992

[30] Foreign Application Priority Data

Nov. 19, 1991 [KR] Rep. of Korea ............ 91-20571

[51] Int. Cl.[5] ............................................. H03K 5/04
[52] U.S. Cl. ................................. 377/54; 307/265; 328/58
[58] Field of Search ............... 377/54; 307/234, 265; 328/58

[56] References Cited

U.S. PATENT DOCUMENTS

| | | | |
|---|---|---|---|
| 4,692,859 | 9/1987 | Ott | 377/54 |
| 4,870,665 | 9/1989 | Vaughn | 307/265 |
| 4,970,418 | 11/1990 | Masterson | 307/265 |
| 5,130,565 | 7/1992 | Girmay | 328/58 |
| 5,221,906 | 6/1993 | Hayashi et al. | 377/54 |

Primary Examiner—John S. Heyman
Attorney, Agent, or Firm—Sughrue, Mion, Zinn, Macpeak & Seas

[57] ABSTRACT

A programmable pulse-width-modulation (PWM) signal generator for selectively generating several PWM signals each of which has a different pulse width. The programmable PWM signal generator, which may be adapted in a television system, includes a shift register for receiving data bits and a clock signal, a latch pulse generating circuit for counting the number of data bits received by the shift register and for generating an address latch pulse if the counted value reaches a predetermined value, an address decoder for generating an enable latch pulse corresponding to the address signal of the shift register in response to the address latch pulse, data latches for latching a value corresponding to the data signal output from the shift register in response to the enable latch pulse, and reloadable down-counters for counting from a value corresponding to the value latched by a respective one of the data latches to zero for producing PWM pulse signals of variable width.

11 Claims, 4 Drawing Sheets

PROGRAMMABLE PULSE-WIDTH MODULATION SIGNAL GENERATOR

BACKGROUND OF THE INVENTION

The present invention relates to an apparatus for generating pulse-width-modulation (PWM) pulses and, more particularly, to a programmable PWM signal generator for selectively generating a plurality of PWM signals each of which having a different pulse width.

PWM pulses are used, for example, in television circuitry, to control the volume, contrast, brightness, color, peaking, tint, treble, bass, balance, etc. Such PWM pulses usually have different pulse widths. In conventional television circuits, in which PWM pulses are required, a microcomputer having interval PWM signal generators is commonly employed. In situations where a weak PWM pulse is output, a digital-to-analog converter integrated circuit is sometimes necessary.

FIG. 1 illustrates a conventional microcomputer 1, which includes internally programmable PWM signal generators to produce signals such as PWM1, PWM2, and PWM3 for controlling the contrast, brightness, and color, respectively of the television. However, the above PWM signal generator is disadvantagous when controlling the above and other various functions of a television. For example, if nine different functions of the television need to be controlled it is difficult to design and manufacture a microcomputer having nine respective internal PWM signal generators. Accordingly, selection of a microcomputer is limited, thus increasing the cost and reducing the reliability of the product.

SUMMARY OF THE INVENTION

Accordingly, to overcome the above disadvantages and problems, it is an object of the present invention to provide a programmable PWM signal generator for selectively generating a number of PWM pulses having different pulse widths based on control signals supplied from a microcomputer, It is another object of the present invention to provide a programmable PWM signal generator which is controlled by two control lines including a clock line and a data line supplied by the microcomputer, using a serial data lines of the microcomputer.

The above and other objects and advantages of the present invention are accomplished by the present invention which provides a programmable pulse-width-modulation signal generator for generator at least one pulse-width-modulation pulse of a variable width including a shift register having a first input for receiving data bits and a second input for receiving a first clock signal, the shift register outputting in response to the data bits an address signal and a data signal, a latch pulse generating circuit, coupled to the first clock signal, for counting the number of data bits received by the shift register and for generating an address latch pulse if the counted value reaches a predetermined value, an address decoder, coupled to the address signal output by the shift register and the address latch pulse of the latch pulse generating circuit, for generating an enable latch pulse corresponding to the address signal of the shift register in response to the address latch pulse, a data latch circuit including a plurality of data latches for latching a value corresponding to the data signal output from the shift register in response to the enable latch pulse, and a reloadable down-counter including a number of reloadable down-counters correspondingly connected to the plurality of data latches, for counting from a value corresponding to the value latched by a respective one of the plurality of data latches to zero in synchronism with a predetermined reference frequency, each of the reloadable down-counters producing a PWM pulse signal of variable width.

BRIEF DESCRIPTION OF THE DRAWINGS

The above and other objects, features, aspects, and advantages of the present invention will become more apparent from the following detailed description of the present invention when taken in conjunction with the accompanying drawings.

DETAILED DESCRIPTION OF THE PREFERRED EMBODIMENT

The construction and operation of a programmable PWM signal generator according to the present invention will be described below in detail with reference to the accompanying drawings.

Figure 1:
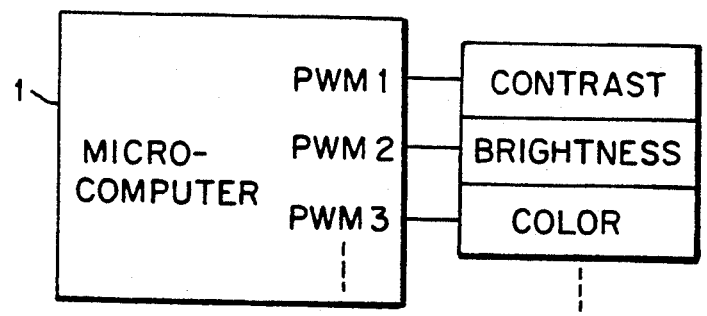
FIG. 1 illustrates a block diagram of a conventional programmable pulse-width-modulation (PWM) signal generator.
Figure 2:
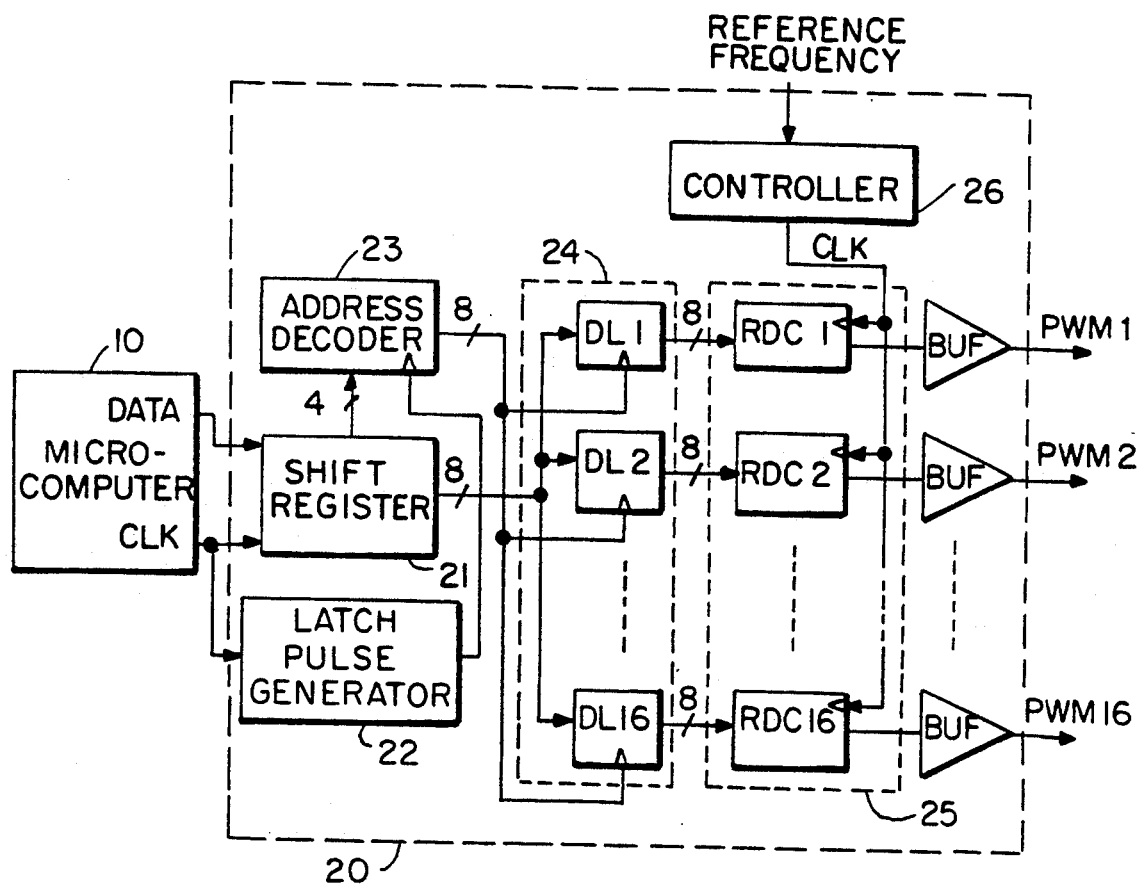
FIG. 2 illustrates a block diagram of a programmable PWM signal generator according to the present invention.

Referring to FIG. 2, there is shown a programmable PWM signal generator 20 according to a embodiment of the present invention, which is controlled by two lines composed of a data line DATA and a clock line CLK supplied from a microcomputer 10, for example. The programmable PWM signal generator 20 selectively generates a predetermined number of PWM pulses corresponding to the input data. For example, the PWM signal generator 20 selects one among n units of PWM pulses for output (where n is an integer).

Figure 3:
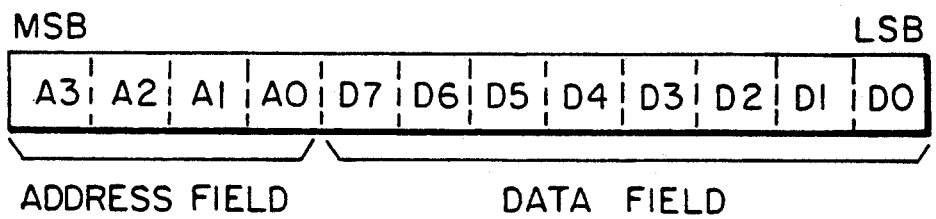
FIG. 3 shows a data format used in the present invention.

In the programmable PWM signal generator 20, the microcomputer 10 supplies data on the data line DATA composed of an address field of four bits A0 to A3 and a data field having eight bits D0 to D7 as shown in FIG. 3. The data is transmitted to and stored in a shift register 21, beginning with the least significant bit LSB. A latch pulse generator 22, which has a first input connected to the clock line CLK of the microcomputer 10, counts the number of the data bits and if the number of data bits reaches a predetermined value, an address latch pulse is generated. An address decoder circuit 23 outputs a high enable latch signal corresponding to the value of the address signals A3, A2, A1, and A0 of the address field when the address latch pulse is generated by the latch pulse generator 22. A data latch portion 24 includes a number of data latches DL1 to DL16 in which a value of the data line is latched only by a corresponding one of the data latches according to the enable latch pulse output by the address decoder 23. A reloadable counter circuit 25 includes a number of reloadable down-counters RDC1 to RDC16, each of which is respectively connected to a corresponding one of the data latches DL1 to DL16. The down-counters are loaded with the value of the data which is latched by the data latches. A controller 26, which is synchronous to a predetermined reference frequency, generates a control signal to reload the reloadable down-counters. After being reloaded, the down-counters count down from the loaded value to zero. The output of each down-counter is respectively coupled to a buffer BUF, which provides the respective PWM signal PWM1, PWM2, . . . PWM16.

Figure 4:
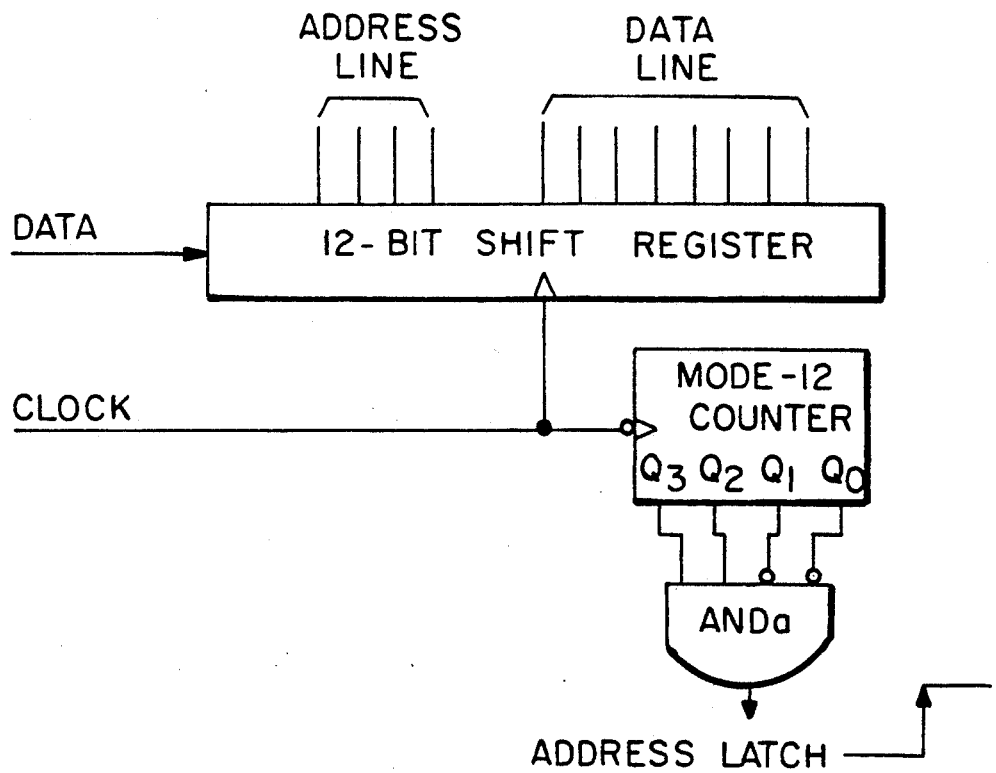
FIG. 4 shows a detailed circuit diagram of a shift register and a latch pulse generator of FIG. 2.

As shown in FIG. 4, the shift register 21 includes a 12-bit shift register which outputs data composed of a 4-bit address field A0 to A3 and an 8-bit data field D0 to D7, as shown in FIG. 3 in response to data received from the data terminal DATA and the clock signal CLK of the microcomputer 10. The 4-bit address signals through the 4-bit address lines are coupled to the address decoding circuit 23 and the 8-bit data signals through 8-bit address lines are coupled to the data latch circuit 24. The latch pulse generator 22 includes a mode-12 counter and an AND gate ANDa. The mode-12 counter is synchronous with the clock signal CLK from the microcomputer 10 and counts the number of data bits which are input to the shift register. When the number of counted data bits reaches 12, the outputs Q3, Q2, Q1, and Q0 of the mode-12 counter are 1100, which in conjunction with the AND gate ANDa cause an address latch pulse to be generated.

Figure 5:
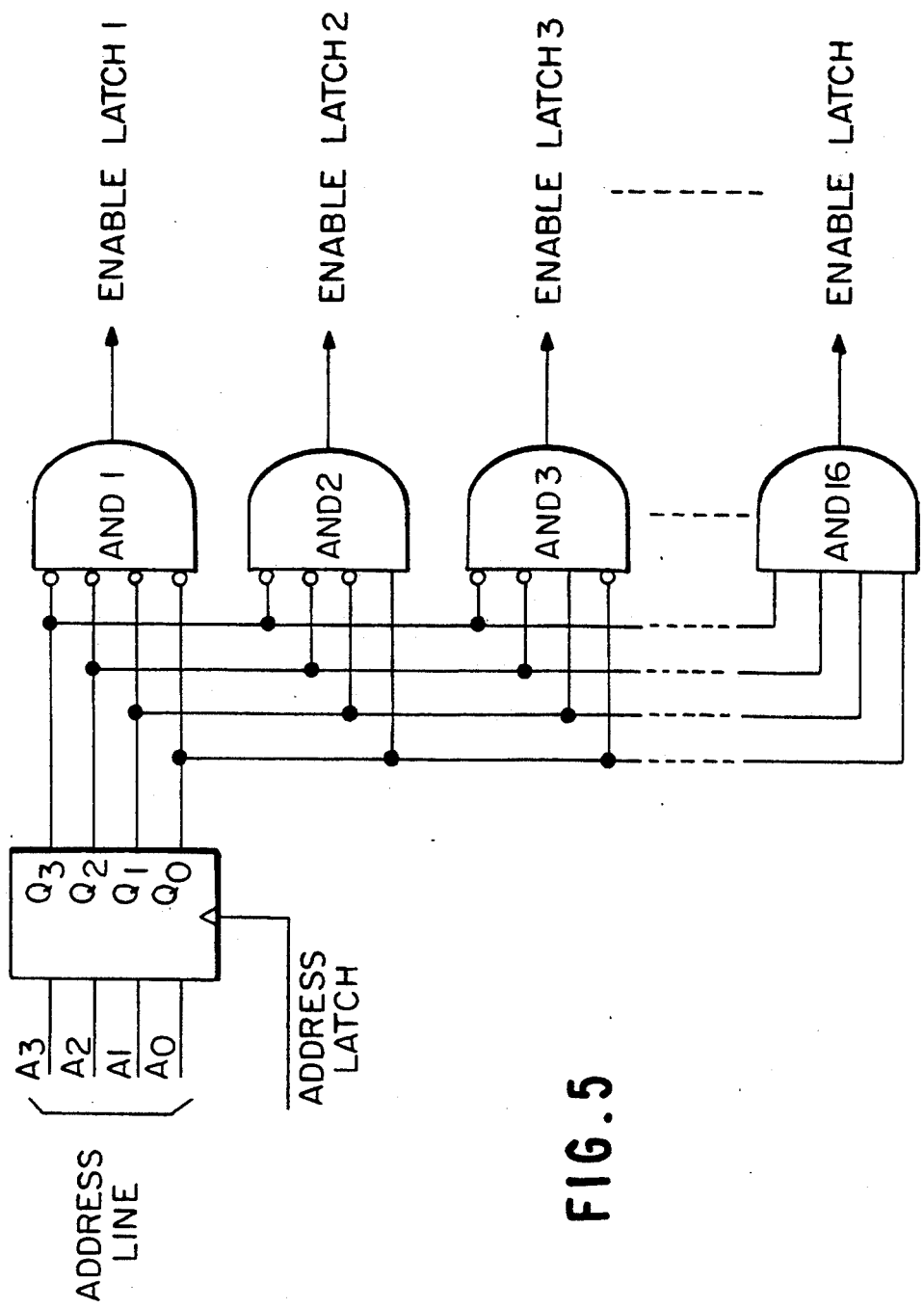
FIG. 5 illustrates a detailed circuit diagram of an address decoder.

As shown in FIG. 5, the address decoder 23 which is connected to the address output lines of the shift register 21 includes a 4-bit latch and 16 units of AND gates AND1 to AND16. The address decoder 23 latches the address signals A3, A2, A1, and A0 in accordance with the address latch pulse and generates one of the enable latch pulses corresponding to the output from the 4-bit latch.

Figure 6:
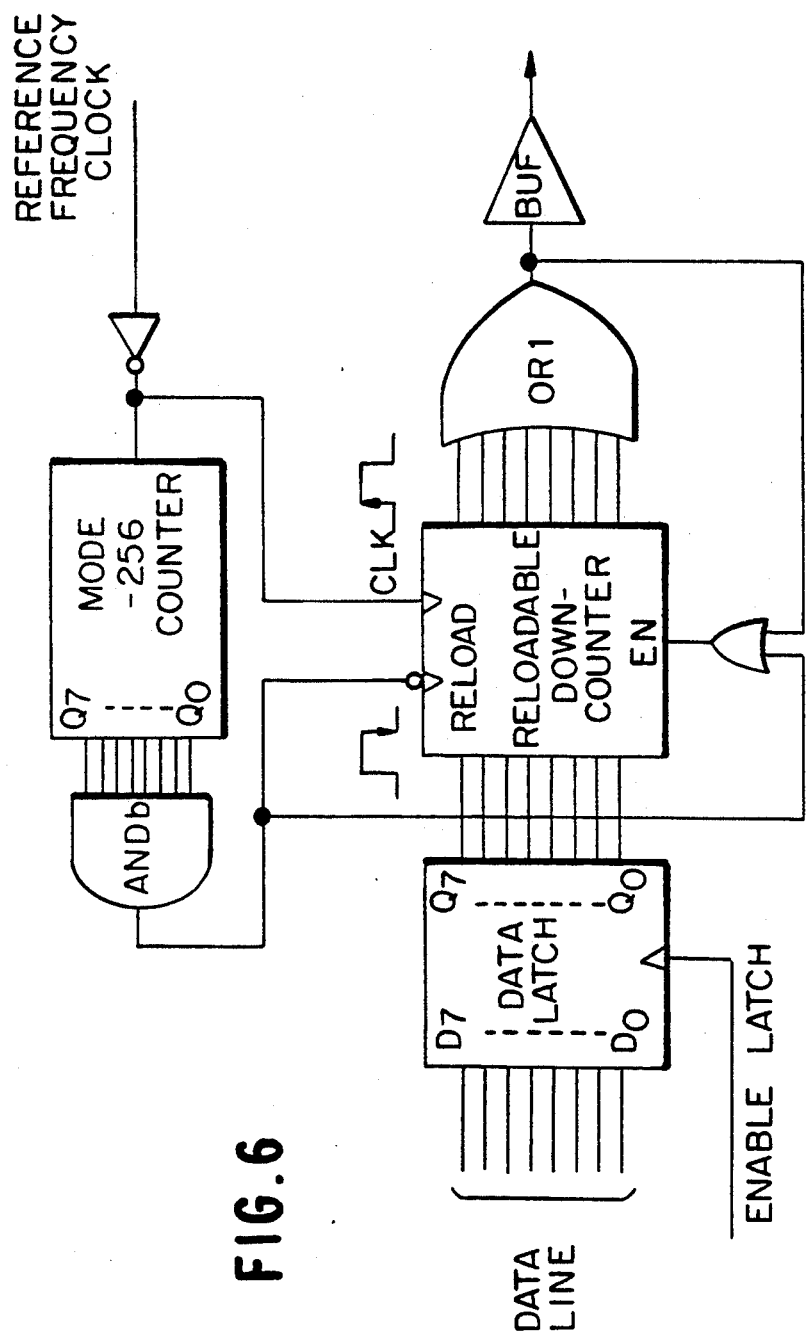
FIG. 6 illustrates a detailed circuit diagram of a data latch, a reloadable down-counter, and a controller of FIG. 2.

The data latch circuit 24, which is connected to the data output lines of the shift register 21, includes 16 units of data latches DL1 to DL16. FIG. 6 illustrates one of these units. The value of the data output lines of the shift register is latched by one of the data latches DL1 to DL16 which is enabled by a corresponding enable latch signal which is set by the address decoder 23. At this time, one input of the reloadable down-counter circuit 25 which is connected to the output of data latch circuit 24 is in a waiting state. The control circuit 26 includes the AND gate ANDb and mode-256 counter. When the mode-256 counter reaches it maximum count, the AND gate ANDb generates a pulse signal, which in turn reloads the reloadable down-counter portion 25 with the value latched by the data latch. The down-counter then counts from the loaded value down to zero. The output of the reloadable down-counter is coupled to an OR gate OR1. When the down-counter reaches zero, since the enable signal is changed to 0 from 1 and the output of the AND gate ANDb is zero, the down-counter stops counting, thereby maintaining the value of 0 at its output.

When the outputs of the mode-256 counter are all high, the enable signal becomes high, which reloads the reloadable down-counter, and the output of the OR gate OR1 becomes high, and the down-counters begin counting again. The reloadable down-counter counts down the reloaded value until the reloadable down-counter outputs a zero.

Although the present embodiment illustrated four address bits to obtain 16 units of PWM signal outputs, the present invention is not limited thereto. That is, the number of address bits can be randomly set to obtain $2^n$ (here, n is the number of address bits) units of PWM signal outputs.

As described above, in the present invention, serial data is supplied to the PWM signal generator which generates the PWM pulses proportional to the supplied data such that each of the PWM pulses has a desired pulse width. The present invention is adapted to a PWM signal varying system for easily controlling volume, contrast and brightness, etc. of a television system, as an example, even if it is necessary to provide a large number of PWM pulses.

What is claimed is:

1. A programmable pulse-width-modulation signal generator for generating at least one pulse-width-modulation pulse of a variable width, comprising:

a shift register having a first input for receiving data bits and a second input for receiving a first clock signal, said shift register outputting, in response to said data bits, an address signal and a data signal;

a latch pulse generating circuit, coupled to said first clock signal, for counting the number of data bits received by said shift register and for generating an address latch pulse if the counted value reaches a predetermined number;

an address decoder, coupled to receive said address signal output by said shift register and said address latch pulse generated by said latch pulse generating circuit, for generating an enable latch pulse corresponding to said address signal of said shift register in response to the address latch pulse;

a data latch circuit for latching a value corresponding to said data signal output from said shift register in response to said generated enable latch pulse; and a reloadable down-counter for counting from a value corresponding to the value latched by said data latch circuit to zero in synchronism with a predetermined reference frequency, said reloadable down-counter producing a plurality of PWM pulse signals of variable width.

2. The programmable pulse-width-modulation signal generator according to claim 1, wherein said data latch circuit comprises a plurality of data latches and said reloadable down-counter comprises a plurality of reloadable down-counters respectively connected to said plurality of data latches.

3. The programmable pulse-width-modulation signal generator according to claim 2, further comprising a controller, responsive to a second clock signal having said predetermined reference frequency, for outputting a control signal in response to said second clock signal, wherein said reloadable down-counters are reloaded according to said control signal.

4. The programmable pulse-width-modulation signal generator according to claim 1, wherein said latch pulse generating circuit comprises a mode-12 counter connected to said first clock signal and an AND gate for logically multiplying an output value of said mode-12 counter for producing said address latch pulse.

5. The programmable pulse-width-modulation signal generator according to claim 1, wherein said address decoder comprises a 4-bit latch for latching said address signal output by said shift register, and a plurality of AND gates coupled to a latched output of said 4-bit latch, each of said plurality of AND gates generating a enable latch pulse according to a value of said latched output of 4-bit latch.

6. The programmable pulse-width-modulation signal generator according to claim 3, wherein said controller comprises a mode-256 counter for counting in synchronism with said second clock and an AND gate for logically multiplying an output of said mode-256 counter for producing said control signal.

7. The programmable pulse-width-modulation signal generator according to claim 1, further comprising an OR gate for logically summing output values of said reloadable down-counter and for feeding back said logically summed value to an enable terminal of said reloadable down-counter.

8. The programmable pulse-width-modulation signal generator according to claim 2, further comprising a plurality of buffers, each being coupled to an output of a respective one of said reloadable down-counters.

9. The programmable pulse-width-modulation signal generator according to claim 1, further comprising a microcomputer for supplying said first clock signal and said data bits.

10. The programmable pulse-width-modulation signal generator according to claim 1, wherein said pulse-width-modulation signals of variable width control characteristics in a television system.

11. The programmable pulse-width-modulation signal generator according to claim 10, wherein said characteristics of said television system comprise volume, contrast, brightness, color, peaking, tint, treble, bass, and balance.

* * * * *